United States Patent [19]
Giamati et al.

[11] Patent Number: 5,544,845
[45] Date of Patent: Aug. 13, 1996

[54] POLYURETHANE DEICER

[75] Inventors: Michael J. Giamati, Akron; Robert W. Ray, Jr., Cuyahoga Falls; Terry L. Sluss, Louisville, all of Ohio

[73] Assignee: The B.F. Goodrich Company, Akron, Ohio

[21] Appl. No.: 399,791

[22] Filed: Mar. 7, 1995

Related U.S. Application Data

[63] Continuation of Ser. No. 130,208, Oct. 1, 1993, abandoned.

[51] Int. Cl.$^6$ .......................... B64D 15/00; B64D 15/12; B64D 15/18
[52] U.S. Cl. ................... 244/134 E; 244/134 A; 244/134 D
[58] Field of Search ............... 244/134 R, 134 A, 244/134 C, 134 D, 134 E

[56] References Cited

U.S. PATENT DOCUMENTS

| | | | |
|---|---|---|---|
| 2,471,224 | 5/1949 | Loughborough | 244/134 E |
| 2,992,317 | 7/1961 | Hoffman . | |
| 3,549,964 | 12/1970 | Levin et al. | 244/134 |
| 3,623,684 | 11/1971 | Kline | 244/134 A |
| 4,073,986 | 2/1981 | Keslar et al. | 428/38 |
| 4,255,552 | 3/1981 | Schollenberger et al. | 528/50 |
| 4,264,643 | 4/1981 | Granata et al. | 428/424.6 |
| 4,278,728 | 7/1981 | Honda et al. | 428/313 |
| 4,463,919 | 8/1984 | Bac | 244/134 A |
| 4,487,913 | 12/1984 | Chung . | |
| 4,494,715 | 1/1985 | Weisand, Jr. | 244/134 A |
| 4,496,611 | 1/1985 | Kawabo et al. | 428/426 |
| 4,613,102 | 9/1986 | Kageorge | 244/134 A |
| 4,687,573 | 8/1987 | Miller et al. | 210/143 |
| 4,690,353 | 9/1987 | Haslim et al. | 244/134 D |
| 4,706,911 | 11/1987 | Briscoe et al. | 244/134 A |
| 4,807,515 | 2/1989 | Briscoe et al. | 91/346 |
| 4,826,108 | 5/1989 | Briscoe et al. | 244/134 A |
| 4,875,644 | 10/1989 | Adams et al. | 244/134 R |
| 5,001,208 | 3/1991 | Ross et al. | 528/61 |
| 5,069,403 | 12/1991 | Marentic et al. | 244/130 |
| 5,096,384 | 3/1992 | Immell et al. | 416/229 R |
| 5,098,982 | 3/1992 | Long, II | 528/44 |
| 5,112,011 | 5/1992 | Weisend, Jr. et al. | 244/134 A |
| 5,129,598 | 7/1992 | Adams et al. | 244/134 D |
| 5,142,767 | 9/1992 | Adams et al. | 29/602.1 |
| 5,152,480 | 10/1992 | Adams et al. | 244/134 D |
| 5,203,189 | 4/1993 | Lovejoy et al. | 72/53 |
| 5,412,181 | 5/1995 | Giamati | 219/548 |

FOREIGN PATENT DOCUMENTS

WO91/11891 8/1991 WIPO .

*Primary Examiner*—Andres Kashnikow
*Assistant Examiner*—Virna Lissi Mojica
*Attorney, Agent, or Firm*—Richard A. Romanchik

[57] ABSTRACT

An improved ice protection apparatus 8 includes a top polyurethane layer 10, an active layer 12, and a base layer 14 cured together into a unitary matrix, wherein the base layer is either polyurethane or chloroprene. The active layer may be either a thermal ice protector, a pneumatic ice protector, or an electro magnetic protection apparatus.

20 Claims, 1 Drawing Sheet

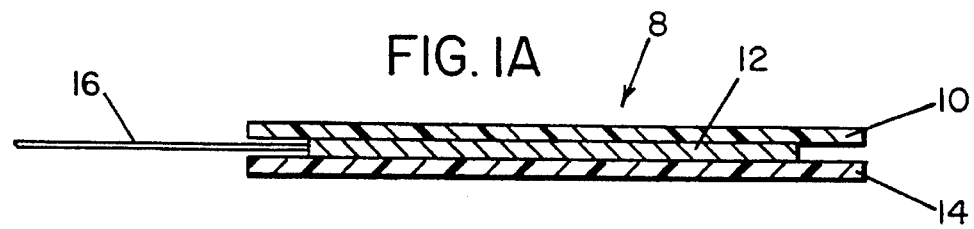
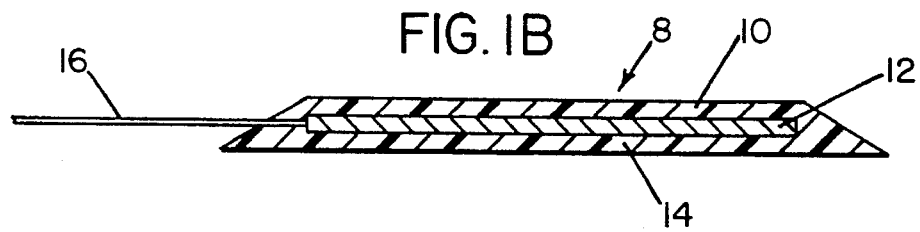
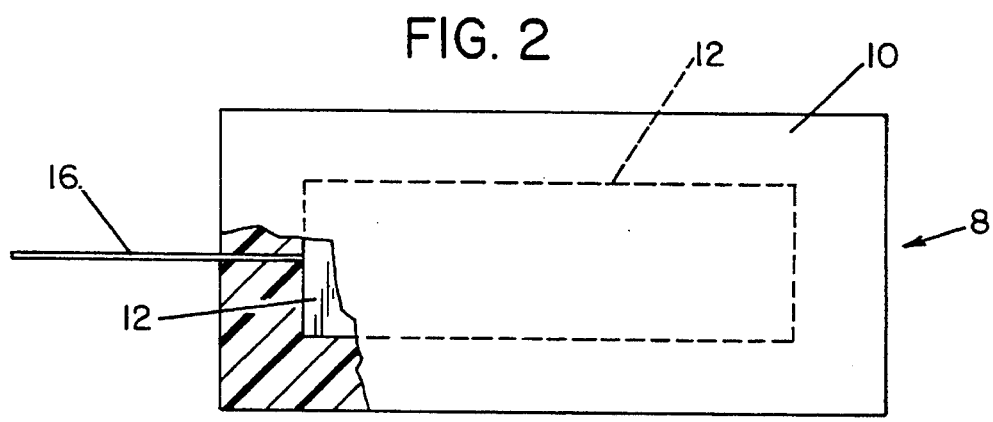
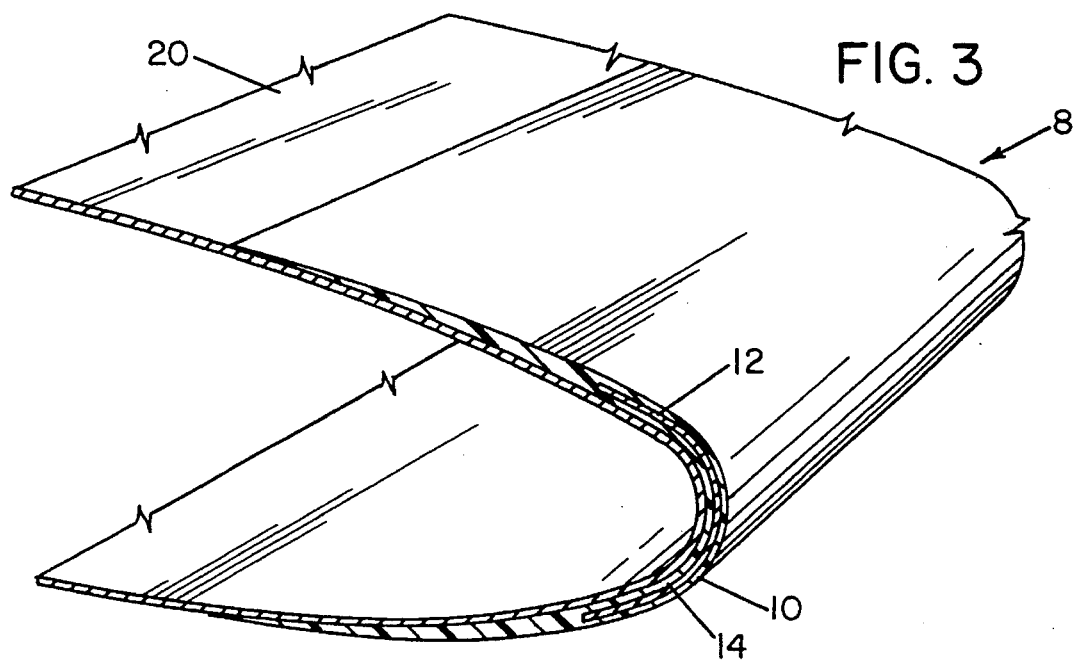

POLYURETHANE DEICER

This is a continuation of application Ser. No. 08/130,208 filed Oct. 1, 1993, now abandoned.

FIELD OF THE INVENTION

The present invention relates to aircraft deicer assemblies, and more particularly to an improved deicer assembly having a polyurethane outer shell.

BACKGROUND ART

The accumulation of ice on aircraft wings and other structural members in flight is a danger that is well known. As used herein, the term "structural members" is intended to refer to any aircraft surface susceptible to icing during flight, including wings, stabilizers, engine inlets, rotors, and so forth. Attempts have been made since the earliest days of flight to over come the problem of ice accumulation. While a variety of techniques have been proposed for removing ice from aircraft during flight, these techniques have had various drawbacks that have stimulated continued research activities. Efforts to prevent and/or remove such accumulations of ice has resulted in three generally universal approaches to remove accumulated ice, a process known as deicing.

One commonly employed method for deicing involves the application of a chemical to all or part of an aircraft to depress adhesion forces associated with ice accumulation upon the aircraft, or to depress the freezing point of water collecting upon the surfaces of the aircraft.

Another commonly employed method for deicing is typically termed mechanical deicing. In the principal commercial mechanical deicing means, pneumatic deicing, the leading edge zone or wing or strut component of an aircraft is covered with a plurality of expandable, generally tube-like structures, inflatable employing a pressurized fluid, typically air. Upon inflation, the tubular structures tend to expand substantially the leading edge profile of the wing or strut and crack ice accumulating thereon for dispersal into the air stream passing over the aircraft component. Other mechanical means for effecting deicing include electro mechanical hammering, such as that described in U.S. Pat. No. 3,549, 964 to Levin et al., U.S. Pat. No. 4,690,353 to Haslim et al., U.S. Pat. No. 4,875,644 to Adams et al., and U.S. Pat. No. 4,706,911 to Brisco et al.

Another common approach for deicing is thermal deicing, wherein the portions of the aircraft that meet and break the air stream impinging on the aircraft are heated to prevent the formation of ice or to loosen accumulated ice. The loosened ice is blown from the structural members by the air stream passing over the aircraft.

In one form of thermal deicing, heating is accomplished by placing electro-thermal pads having heating elements over the leading edges of the aircraft, or by incorporating heating elements into the structural members of the aircraft. Electrical energy for each heating element is derived from a generating source driven by one or more of the aircraft engines. The electrical energy is intermittently or continuously supplied to provide heat sufficient to prevent the formation of ice or to loosen accumulating ice.

With some commonly employed thermal deicers, the heating elements are configured as ribbons i.e. interconnected conductive segments, that are mounted on a flexible backing. The conductive segments are separated from each other by gaps i.e. intersegmental gaps, and each ribbon is electrically energized by a pair of contact strips. When applied to a wing or other airfoil surface, the segments are arranged in strips or zones extending spanwise or cordwise of the aircraft wing or airfoil. In its simplest form an electro-thermal deicing pad consists of an electrical surface heating element sandwiched between two layers of insulation and attached or bonded to the surface or structure to be deiced. In operation, after a certain amount of ice has formed on the pad, the electrical current to the heater is turned on and when sufficient heat has been delivered to the pad/ice interfaced to destroy the adhesion between the ice and the pad thus permitting aerodynamic or centrifugal forces to remove the ice the heater has melted off.

Heretofore, flexible coverings of rubber or other elastomeric material have been used as outer skins for mechanical and thermal deicing systems. However, these rubber coverings when used on aircraft at higher speeds generally suffer objectional bowl abrasion, erosion, and cutting of the rubber by sand, rain drops, sleet and small ice particles impinging thereon. Prior electrically heated, flexible coverings of rubber or other elastomeric material with circular cross-section, solid or stranded wire, heating elements imbedded in the rubber of the covering may suffer breakage of the heating wires and also objectionable abrasion, erosion and cutting by rain drops and the like at high aircraft speeds.

It is an objective of the aircraft industry to increase the life time of such deicing apparatus. Efforts to improve such systems have led to continuing developments to improve their versatility, practicality, efficiency, and reliability.

SUMMARY OF THE INVENTION

According to an aspect of the present invention, there is provided an ice protection apparatus for an airfoil comprising an active element layer disposed between a top polyurethane layer and a bottom layer, said top and bottom layers being cured into a unitary matrix.

According to another aspect of the present invention, there is provided a method of providing an ice protection apparatus for an airfoil comprising the steps of:

a) providing a top polyurethane layer;

b) providing an active deicing layer;

c) providing a base layer; and, d) curing said polyurethane layer, active layer and base layer into a unitary matrix.

BRIEF DESCRIPTION OF THE DRAWINGS

FIG. 1A is a cross sectional view of an ice protection apparatus in accordance with the present invention, before curing.

FIG. 1B is a cross sectional view of an ice protection apparatus in accordance with the present invention after curing.

FIG. 2 is a top view of an ice protection apparatus in accordance with the present invention.

FIG. 3 is an isometric, cross sectional fragmentary view of an ice protection apparatus in accordance with the present invention mounted on an airfoil.

BEST MODE FOR CARRYING OUT THE INVENTION

Referring now to FIG. 1A, an ice protection apparatus or boot 8 in accordance with the present invention includes a top layer or ply 10 of a polyurethane mixture, an active ice protection element 12 disposed directly beneath the top layer 10, and a base layer or ply 14 disposed on the other side of active element 12, all of which are formed into an integral assembly. Active element 12 is that part of the apparatus which causes either prevention or removal of ice, and is controlled via a line 16, which protrudes from the boot 8. Base layer 14, may be comprised of any of a number of materials which are pliable enough to facilitate the installation of the boot 8 onto curved airfoil surfaces and can be cross-linked with top layer 10, but is preferably either the same material as top layer 10, or a chloroprene based material. The materials for layers 10, 14 will be described in further detail hereinafter.

Referring now to FIG. 1B, top layer 10 and base layer 14 are cured together into a unitary matrix so as to form completely around active layer 12 and create an integral deicing boot 8.

Referring now to FIG. 2, deicing apparatus 8 has a top layer 10, an active layer 12 disposed there beneath and a control line 16.

Referring now to FIG. 3, the ice protection apparatus 8 of the present invention is disposed on an airfoil 20 and is comprised of an active layer 12 formed within a top layer 10 and a base layer 14, with the top layer and bottom being cured together into an integral assembly so that the two layers cannot be readily discerned after curing.

Top layer 10 illustrated in FIGS. 1A, B, is a cross-linked, thermoset abrasion resistant polyurethane, cured with peroxide and is formed from a mixture of materials provided in the list of ingredients in TABLE I.

TABLE I

| INGREDIENT | PARTS/100 RUBBER |
|---|---|
| Aliphatic Urethane | 75.00 |
| Aromatic Urethane | 25.00 |
| Carbon Black | 1.00 |
| UV light protector | 3.00 |
| Organic Peroxide curing agent | 5.00 |
| Pthalamide accelerator | 2.50 |
| Nitrosodiamine scorch retarder | 0.25 |
| Total | 111.75 |

The preferred peroxide curing agent is LUPERCO 130XL (2,5-dimethyl-2,5-di(t-butyl-peroxy)hexme-3) curing agent available from the ATO Chemical Company. Other peroxides may work for the present invention, depending on the cure temperatures needed.

The preferred pthalamide accelerator is HVA-2 (n,n-phenylene-bis-pthalamide) accelerator available from E. I. DuPont deNemours & Company. The preferred nitrosodiamine scorch retarder is NITROSO retarder available from Prochemie, Inc. The HVA-2 and NITROSO work together to provide scorch resistance without stopping the ability to cure. There use is well known in the art for natural rubber and EPDM elastomers. The preferred carbon black is N-774 available from any of a number of manufacturers, such as Cabot Corp. or Akzo Chemical Inc. The preferred aliphatic urethane is the polyester thermoplastic polyurethane MORTHANE PN3429, a proprietary mixture of polymers derived from 4,4' diphenylmethane-isocyanate;4,4'-cyclohexane-dimethanol and an aliphatic dibasic acid such as adipic acid available from the Morton International, with the preferred physical requirements as follows in TABLE II. A more detailed description of these polyurethanes is found in U.S. Pat. Nos. 5,203,189 and 5,001,208.

TABLE II

| ALIPHATIC URETHANE PHYSICAL REQUIREMENTS | |
|---|---|
| Hardness | 85–90A |
| Tensile Strength (PSI) | 10,000 |
| 300% Modulus (PSI) | 5,600 |
| Elongation (%) | 450 |
| Specific Gravity | 1.19 |

The preferred aromatic urethane is the MDI based polyester polyurethane thermoplastic ESTANE 5703P available from B. F. Goodrich Company, which is made from a polyester intermediate utilizing MDI and 1,4-butane diol, with the preferred physical requirements as follows in TABLE III.

TABLE III

| AROMATIC URETHANE PHYSICAL REQUIREMENTS | |
|---|---|
| Hardness | 70A |
| Tensile Strength (PSI) | 5,300 |
| 300% Modulus (PSI) | 450 |
| Elongation (%) | 730 |
| Specific Gravity | 1.21 |

Manufacture of top layer 10 is as follows. The above ingredients are mixed in the standard mill roll mixing procedure, wherein the lower viscosity ESTANE urethane is first banded, and then the following ingredients are added in their respective order: CYASORB UV24; N-774 carbon black; HVA-2; and NITROSO. Cross blending of these materials should be done a minimum of six times. Then the LUPERCO 130XL is added and mixed completely by cross blending a minimum of six times, slabbed off and cooled. The MORTHANE is then banded on the mill, and once broken down, the Estane master batch provided above is added slowly in order to prevent breaking up of the batch and bagging on the mill. The new compound should be mixed completely by cross blending a minimum of six times. The mixture is then slabbed off and cooled.

Bottom layer 14 may be comprised of a chloroprene mixture. If so, the chloroprene is formed from a mixture of materials provided in the list of ingredients in TABLE IV.

TABLE IV

| INGREDIENT | PARTS/100 RUBBER |
|---|---|
| Chloroprene | 100.00 |
| Mercaptoimidazoline | 1.00 |
| Carbon Black | 23.75 |
| Polyethylene | 4.00 |
| Stearic Acid | 0.50 |
| Pthalamide Accelerator | 0.75 |
| Zinc oxide | 5.00 |
| Magnesium Oxide | 6.00 |
| N-Butyl Oleate | 4.00 |
| Oil | 5.00 |
| Diphenylamine Antioxidant | 4.00 |
| TOTAL | 154.00 |

The preferred chloroprene is NEOPRENE WRT available from E. I. DuPont deNemours & Company. The preferred Mercaptoimidazoline is END 75, NA22 available from Wyrough & Loser. The preferred carbon black is N330 available from any of a number of manufacturers, such as Cabot Corp. or Akzo Chemical Inc. The preferred polyethylene is the low molecular weight polyethylene AC1702 available from Allied Signal. The preferred pthalamide accelerator is HVA-2 (n,n-phenylene-bispthalamide) accelerator available from E. I. DuPont deNemours & Company. is The stearic acid and zinc oxide utilized may be procured from any of a number of available sources well known to those skilled in the art. The preferred magnesium oxide is available from Basic Chemical Co. The preferred oil is Superior 160, available from Seaboard Industries. The preferred diphenylamine antioxidant is BLE25 available from Uniroyal Corp.

Manufacture of the chloroprene for bottom layer 14 is as follows. The chloroprene resin is mixed on the mill, and then the ingredients listed in TABLE IV are added in their respective order. When the mix is completely cross blended, the mixture is then slabbed off and cooled.

Active element 12 may be any of a number of elements used to either deice an airfoil or prevent ice from forming thereon. For instance, active layer 12 may be a thermal deicer such as is disclosed in commonly owned U.S. Pat. No. 2,992,317 to Hoffman, which is hereby incorporated herein by reference. Active layer 12 may also be a pneumatic type deicer, such as is disclosed in commonly owned U.S. Pat. Nos. 5,112,011 and 4,494,715, to Wiesend Jr. et al. and Wiesend Jr. which are also hereby incorporated herein by reference. Active layer 12 may also be an electro-magnetic apparatus, such as is disclosed in commonly owned U.S. Pat. Nos. 5,152,480, 5,129,598 and 5,142,767 all to Adams et al., which are also hereby incorporated herein by reference.

Manufacture of the ice protection apparatus is as follows. First apply the top urethane layer 10 onto the building fixture, being careful to remove any trapped air, so that the urethane layer lays flat. Next, apply a tie-in cement, such as CHEMLOK 233, available from the Lord Corporation to the top layer 10, and also to the top side of the active layer 12, and apply the active layer 12 to the top layer 10. Next, apply a building cement, preferably a chloroprene cement such as catalog no. A1551B available from the B. F. Goodrich Company, Adhesive Systems business unit, to the bottom side of the active layer 12 and apply the base layer 14 to the active layer 12, being careful to remove any trapped air. Next, brush a surface cement, such as the chloroprene based cements available from 3M, DuPont or Bostik onto the assembly, remove wrinkles, bag, pull vacuum and cure in a steam autoclave at 40–60 psi, 310° F. for about 40 minutes.

If bottom layer 14 is chloroprene, it must first be tackified with a tackifying solvent such as burylacerate before being applied to the active layer 12.

The polyurethane top layer 10 and the base layer 14, regardless of whether it is made of polyurethane or chloroprene, are preferably greater than 0.008 inches thick.

The present invention improves the longevity of ice protection systems by providing a top layer which has superior erosion characteristics than those of previous ice protection apparatus. The present invention also has comparable heat transfer characteristics, allows for reduced overall ice protection thickness, is easy to manufacture, has reduced cost and weight, and facilitates deicers which may be provided in a variety of colors not previously available. The present invention also offer improved resistance to typical fluids found in the aircraft operating environment, such as diester engine oils and the like.

Although the invention has been shown and described herein with exemplary embodiments thereof, it is to be understood by those skilled in the art that the foregoing and various other changes, omissions and additions may be made therein and thereto without departing from the spirit and the scope of the invention.

We claim:

1. An ice protection apparatus for an airfoil comprising an active element layer disposed between a resilient top layer and a bottom layer cured into a unitary matrix, said top layer comprising a thermoset polyurethane derived from a thermoplastic polyurethane cross-linked with a curing agent.

2. An ice protection apparatus in accordance with claim 1, wherein said top layer is greater than 0.008 inches thick before curing.

3. An ice protection apparatus in accordance with claim 1, wherein said top layer is comprised of aliphatic and aromatic urethane.

4. An ice protection apparatus in accordance with claim 3, wherein said top layer is further comprised of nitrosodiemine.

5. An ice protection system in accordance with claim 1, wherein said base layer is comprised of polyurethane.

6. An ice protection system in accordance with claim 1, wherein said base layer is comprised of chloroprene.

7. An ice protection system in accordance with claim 1, wherein said active layer is comprised of thermal deicer means.

8. An ice protection system in accordance with claim 1, wherein said active layer is comprised of pneumatic deicer means.

9. An ice protection system in accordance with claim 1, wherein said active layer is comprised of electro-magnetic deicing means.

10. A method for providing an ice protection apparatus for an airfoil comprising the steps of:
a) cross-linking a thermoplastic polyurethane with a curing agent to thereby form a thermoset polyurethane resilient top layer;
b) providing an active deicing layer;
c) providing a base layer; and,
d) curing said top layer, active layer and base layer into a unitary matrix.

11. A method for providing an ice protection apparatus in accordance with claim 10, wherein said top layer is greater than 0.008 inches thick before curing.

12. A method for providing an ice protection apparatus in accordance with claim 10, wherein said top layer is comprised of aliphatic and aromatic urethane.

13. A method for providing an ice protection apparatus in accordance with claim 12, wherein said top layer is further comprised of nitrosodiamine.

14. A method of providing an ice protection apparatus in accordance with claim 10, wherein said base layer is comprised of polyurethane.

15. A method of providing an ice protection apparatus in accordance with claim 10, wherein said base layer is comprised of chloroprene.

16. A method of providing an ice protection apparatus in accordance with claim 10, wherein said active layer is comprised of thermal deicer means.

17. A method of providing an ice protection apparatus in accordance with claim 10, wherein said active layer is comprised of pneumatic deicer means.

18. A method of providing an ice protection apparatus in accordance with claim 10, wherein said active layer is comprised of electro-magnetic deicing means.

19. An ice protection apparatus for an airfoil in accordance with claim 1, wherein said curing agent comprises a peroxide.

20. A method for providing an ice protection apparatus for an airfoil in accordance with claim 10, wherein said curing agent comprises a peroxide.

* * * * *